United States Patent
Lajeunesse

(10) Patent No.: US 6,929,061 B2
(45) Date of Patent: Aug. 16, 2005

(54) MOBILE REFRIGERATOR WITH REPORTING SYSTEM

(76) Inventor: Marc Lajeunesse, 1879 Wentwood Cove, Lake Mary, FL (US) 32746

( * ) Notice: Subject to any disclaimer, the term of this patent is extended or adjusted under 35 U.S.C. 154(b) by 65 days.

(21) Appl. No.: 10/021,493

(22) Filed: Oct. 30, 2001

(65) Prior Publication Data

US 2002/0053213 A1 May 9, 2002

(51) Int. Cl.$^7$ ................................................. B60H 1/00
(52) U.S. Cl. ............................. 165/202; 165/42; 62/239
(58) Field of Search ........................... 165/202, 42, 41, 165/43; 62/239

(56) References Cited

U.S. PATENT DOCUMENTS

| | | | |
|---|---|---|---|
| 4,919,477 A | * | 4/1990 | Bingham et al. ........ 296/24.36 |
| 5,572,873 A | | 11/1996 | Lavigne et al. |
| 5,809,785 A | | 9/1998 | Polkinghorne |
| 5,924,289 A | * | 7/1999 | Bishop, II ...................... 62/3.7 |
| 6,082,799 A | | 7/2000 | Maurek |

FOREIGN PATENT DOCUMENTS

JP 0419567 * 8/1991 ................. 165/202

* cited by examiner

Primary Examiner—Ljiljana Ciric
(74) Attorney, Agent, or Firm—McHale & Slavin PA

(57) ABSTRACT

A self-contained, portable, computer operated, light weight, temperature controlled compartment for installation in emergency vehicles has insulated walls and a door. The compartment carries a mechanical refrigeration system having a small compressor for cooling the interior and electrical heating units providing radiant heat to the interior. The heating and cooling units are controlled by a microcomputer and temperature sensor to keep the interior within a desired range of temperature.

10 Claims, 2 Drawing Sheets

MOBILE REFRIGERATOR WITH REPORTING SYSTEM

FIELD OF THE INVENTION

This invention relates to the field of mobile refrigeration systems for Emergency Medical Service (EMS) vehicles and other vehicles requiring a cooling capability and a reporting system to record performance parameters in real time.

BACKGROUND OF THE INVENTION

Formerly, ambulances were manned by minimally trained crews with the ultimate goal of getting the patient to a hospital or emergency room as quickly as possible. The vehicles were equipped with very basic equipment, such as back-boards, tourniquets and pressure bandages.

It has become standard practice, in most jurisdictions, to provide emergency medical treatment and rescue through Emergency Medical Service (EMS) with highly trained crews and appropriately equipped vehicles. The vehicles now used for EMS are much more sophisticated than the mere transportation formerly available. The vehicles carry resuscitators, intravenous solution kits, including blood plasma and whole blood, and pharmaceuticals in solid and liquid form. The vehicles also include electrical devices for cardiac treatment, for gathering and recording medical data from the patient, such as blood pressure, pulse rate, electrocardiogram, and pulmonary data, among other things.

Some of the solutions and pharmaceuticals carried on EMS vehicles are time and temperature sensitive. Also, some of the drugs carried in the vehicles are controlled substances and must be used by authorized personnel. Usually, such items are stored at a base facility and loaded on a vehicle for a specific emergency.

Other vehicles are now being used for investigations or research that require a permanent record of the activities, inventories, and parameters of collected items. For example, vehicles used to investigate crime scenes require records to establish chain of custody, as well as, the conditions of the items in custody. Research vehicles, in general, have use for devices that can be used to control temperature and make a historical record of the contents in the vehicle.

Regardless of the specific activity to which the vehicle is dedicated, all the equipment must be operated from the electrical system of the vehicle or from batteries carried with each item of electrical equipment.

DESCRIPTION OF THE PRIOR ART

U.S. Pat. No. 5,572,873 issued to Lavigne et al teaches an insulated carrier apparatus for storing pharmaceuticals. The portable carrier apparatus is battery operated and connected to a Peltier effect thermocouple or thermopile for controlling the temperature inside the carrier, with the temperature control calling for heat or cold as the temperature fluctuates. An audible alarm is activated upon a low voltage battery condition. The apparatus includes a memory chip to record the temperature range in the carrier and the time out of desired parameters. The memory chip also records the opening and closing of the door of the carrier.

In addition, the carrier apparatus can provide patient medical status and parameters, in printed form, for review of medical personnel at a receiving facility. The printed form may include pharmaceuticals administered to the patient, if properly entered in the memory by key pad.

The entire apparatus is self contained and may be carried by an ambulance on an emergency mission. Otherwise, it is connected to a standard electrical circuit.

U.S. Pat. No. 5,809,785 issued to Polkinghorne teaches a Peltier thermoelectric refrigeration drive assembly for a compact refrigerator for use in recreational vehicles, marine vessels, ambulances and delivery vehicles. The device has at least two refrigerated compartments with the ability to maintain different temperatures in each compartment.

U.S. Pat. No. 6,082,799 issued to Marek teaches a mobile ambulatory surgery center on a vehicle chassis. The vehicle includes a refrigerator.

WIPO Publication No. WO 00/17585 published Mar. 30, 2000 teaches a micro compressor for use in refrigerating systems. The micro compressor is suited for portable temperature control systems, as disclosed here.

What is needed is an integrated vehicular mounted system having a secure compartment with an independent refrigerator and heater for temperature control and a recording system to provide historical data concerning the use and contents of the compartment.

SUMMARY OF THE INVENTION

Accordingly, it is an objective of the instant invention to teach a temperature controlled compartment having a secure door which records openings and closings, as well as, door ajar and door open times.

It is a further objective of the instant invention to teach electronically controlling the temperature in a vehicular compartment by a compressor driven refrigeration unit and by use of electric resistance heat.

It is yet another objective of the instant invention to teach an electronic soft start program for the compressor.

It is a still further objective of the invention to teach running the compartment on a 12 volt electrical system.

It is another objective of the instant invention to teach the use of a printer to log date, time and temperature when the refrigerator or heater is activated.

It is another objective of the invention to teach a vehicular mounted visual electronic continuous indicator of the temperature in the compartment and a circuit that is temperature sensitive to sound an alarm when the temperature is out of limits.

Other objects and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

DETAILED DESCRIPTION OF THE INVENTION

Figure 1:
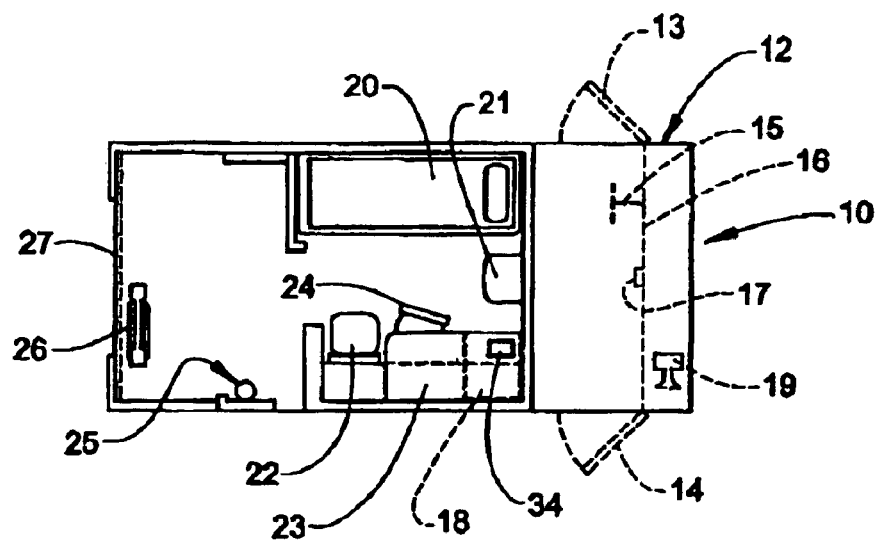
FIG. 1 is a partial cut-away of a vehicle having the temperature controlled compartment of this invention installed therein.

The vehicle 10, shown in FIG. 1, may be an EMS ambulance, or a crime scene mobile laboratory or a mobile scientific laboratory. Other vehicles, such as RV's and campers, or long distance trucks may carry the temperature controlled compartment.

The vehicle 10 has all the basic components of a motor vehicle including a chassis, wheels, motor driving the wheels, transmission,(not shown) and an electrical system 11 powered by a battery. Steering apparatus is controlled by steering wheel 15.

In FIG. 1, the driver's compartment or cab 12 has access doors 13 and 14. A dashboard or instrument panel 16 has the standard vehicle instruments providing the driver with visual information concerning the parameters of the operation of the vehicle components. These instruments may be analog or digital or a combination. Also present in the cab 12 is an temperature gauge 17 indicating the temperature in the temperature controlled compartment 18. The gauge 17 is located on the instrument panel, as illustrated, but may be mounted at other locations visible to the crew. The vehicle horn 19 can be connected, through the electrical system, to the temperature sensor or gauge 17 to sound an aural alarm when the temperature in the compartment is outside the programmed range of acceptable temperatures.

The rear portion of the vehicle is arranged to receive a patient Gurney 20 and EMS personnel seats 21 and 22. A work space in the form of a counter top 23 is above the temperature controlled compartment 18. A swing out printer and CRT monitor 24 is provided for viewing a selection of vital signs of the patient. Storage cabinets are above the counter top 23 and can be located to the rear of the Gurney. A sink and refuse tank combination 25 provides a source of water. Also illustrated, is a stored collapsed folding wheel chair 26. The entire rear of the vehicle is enclosed and has large opening doors 27.

The instruments providing vital signs (not shown), the printer and electronic monitor 24 and the refrigerator 18 are integrated into the electrical system of the vehicle 10 for electrical power. The vehicle may be equipped with an external power plug and transformer (not shown) for connection to a standard electrical outlet when the vehicle is not in service.

Figure 2:
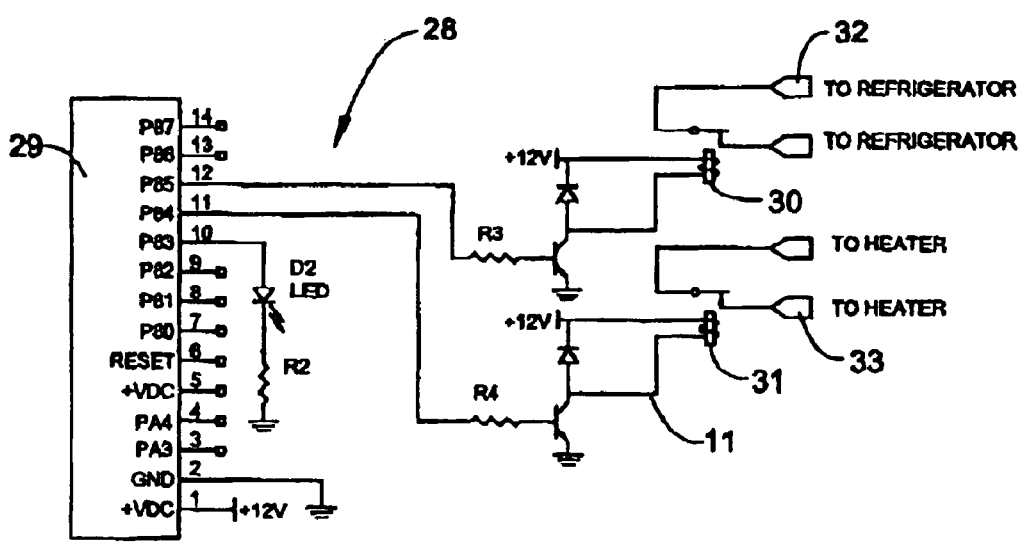
FIG. 2 is a schematic of the computer control of this invention.

FIG. 2 shows a schematic of the computer chip 28 used to operate the refrigerator and alarms. As shown, the computer may be wired into the vehicle electrical system 11. The computer chip is available on the market, for example, under the name, "PICSTIC". The computer controller 28 incorporates digital inputs and outputs, analog inputs, real-time monitoring, power-input regulation, and serial communication in a single module. The operating voltage may be from 5 volts to 24 volts DC and will operate at the conventional 12 volt vehicle system. The computer 29 is a low-cost CMOS fully-static 8 bit micro-controller with 1 KB×14 EEPROM program memory and 64 bytes of EEPROM data memory. The controller manages the temperature controlled compartment through 12 volt relays 30 and 31 to the compressor 32 of the mechanical refrigerator system and the resistance coils of electric heaters 33.

The electric heaters 33 are mounted in the walls of the temperature controlled compartment to provide radiant heat to the interior. The compressor/condenser/evaporator is also mounted on a wall of the compartment to provide cooling air to the interior of the compartment. The evaporator is vented to the ambient atmosphere, by fan, through the vehicle wall. The overall size of the under counter space is approximately 18 inches depth, 20 inches height, and 17.75 inches width for a compartment having an interior space of 2 cubic feet. The weight of this unit is approximately 25 pounds. For an interior space of approximately 4 cubic feet, the overall compartment space is approximately 26.625 inches depth, 20.5 inches height, and 17.75 inches width with an approximate weight of 45 pounds. The temperature controlled compartment may be made in various sizes and the above dimensions are merely representative.

With this computer, the desired temperature can be set for practically any range. Also, a log can be kept to show the date, time, and temperature every time the cooling or heating units come on-line. The computer can track the date, time and temperature of instances in which the temperature is out of the specified range and the duration of such instances. A printer option 34 can make a written record of these parameters. The programming includes a "soft start" program that facilitates initiation of cooling or heating without a surge in the system. The controller will send a signal to the gauge 17 every second. The computer also has a data port for connection to download and upload information to other computers, such as another on-board computer or archive.

As an example, some pharmaceutical manufacturers recommend that optimal temperatures for some drugs is between 59 and 86 degrees F. The computer may be programmed to initiate heating at 61 degrees F. and cooling at 83 degrees F. The limit for each separate system may be set at 70 degrees F.

Another modification of the temperature controlled compartment includes an electrical connection through the door latches 62 and 66 to the computer. This permits a record of every time, date and temperature that a door latch is operated and the duration of time the door is not latched. The printer may make a written record of this information for future use. This sub-system is desirable if the compartment is used to store controlled substance drugs and/or other materials requiring a record of their possession and parameters of storage.

Figure 3:
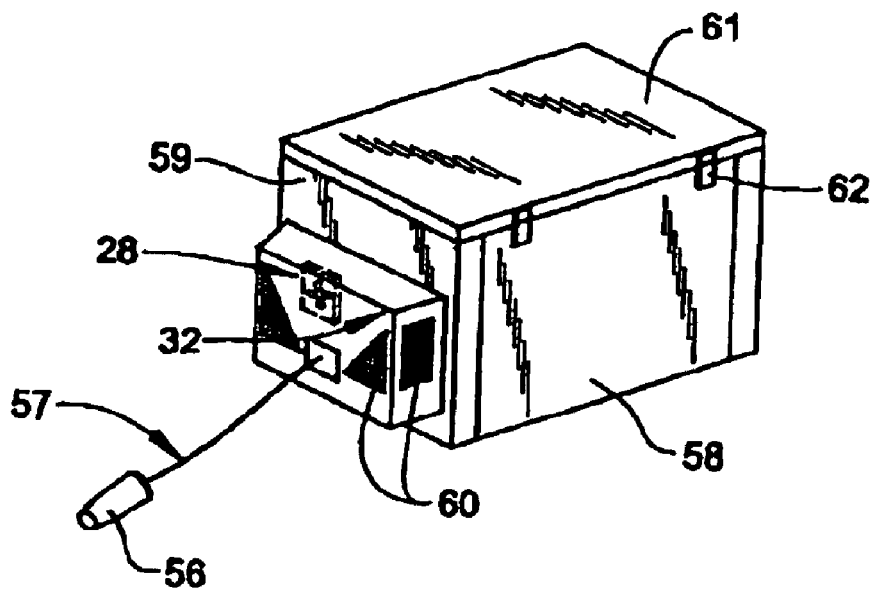
FIG. 3 is a perspective of the temperature controlled storage container of this invention.

FIG. 3 shows a similar system having all the features and dimensions, as described above, without being integrally installed in a vehicle. This controlled temperature storage container 58 may be connected to a vehicle electrical system through a power cord 57 with cigarette lighter adapter 56. The mechanical refrigeration system is mounted on an end wall 59 and the evaporator is vented through grills 60. This allows the device to be used without ventilation to ambient atmosphere. As shown, the container has a top loading door 61 and door latches 62. This unit permits continuous storage of temperature sensitive materials at a permanent site without drawing on a vehicle's battery. This simplifies record keeping and un-necessary handling of the contents when the vehicle is not used for prolonged periods of time.

Figure 4:
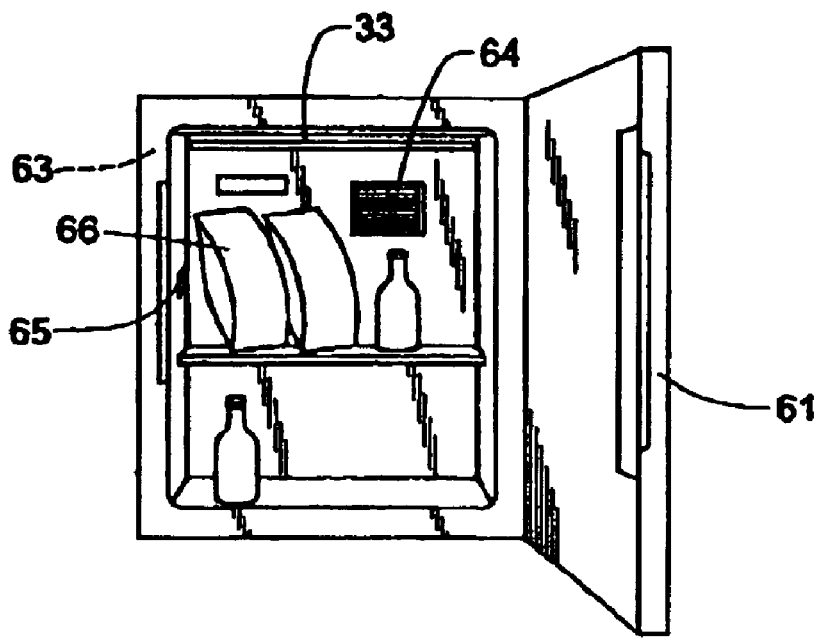
FIG. 4 is a perspective of the interior of the temperature controlled compartment.

The interior of the device is shown in FIG. 4. The door, side walls, bottom and top of the temperature controlled compartment have insulation 63 for assisting in maintaining interior temperature. The vent 64 connects the refrigeration system to the interior space. The temperature sensor 65 is mounted on an interior wall. As shown, whole blood bags 66 are stored in the interior.

It is to be understood that while a certain form of the invention is illustrated, it is not to be limited to the specific form or arrangement of parts herein described and shown. It will be apparent to those skilled in the art that various changes may be made without departing from the scope of the invention and the invention is not to be considered limited to what is shown and described in the specification and drawings.

What is claimed is:

1. In a mobile vehicle including an electrical system of at least 12 volts capacity, said vehicle adapted to carry temperature sensitive components which require a certain range of temperatures, an integral temperature controlled compartment connected to said vehicle electrical system, said compartment having insulated walls with a mechanical refrigerating unit operated by an electrically powered compressor mounted on said compartment to provide a portion of said certain range of temperatures for said compartment, an electrical heating unit mounted on said compartment to provide a portion of said certain range of temperature for said compartment, said compartment having a temperature sensor, and a door mounted on a wall of said compartment to selectively gain access to the interior of said compartment.

2. In a mobile vehicle of claim 1 wherein said electrical heating unit includes resistance coils, said mechanical refrigerating unit and said electric heating unit are electronically controlled by computer connected to said vehicle electrical system, said computer programmed with said certain range of temperatures, said computer connected to said temperature sensor, said temperature sensor signaling said computer as to the temperature in said compartment, said computer activating said refrigerating unit or said electrical heating unit in response to said temperature sensor signal to maintain said compartment within said certain range of temperatures.

3. In a mobile vehicle of claim 2 wherein a certain temperature may be selected within said certain range and programmed into said computer, said vehicle electrical system includes a horn, said computer programmed to activate said horn when said temperature sensor reaches said certain temperature.

4. In a mobile vehicle of claim 2 wherein said door has a latch, said latch is connected to said computer, said computer recording the date, time and temperature in said compartment when said latch is operated, said computer recording the duration of time said door is ajar.

5. In a mobile vehicle of claim 1 wherein said door has a latch, said latch is connected to said computer, said computer is connected to an electronic printer, said printer making a written record of the date, time, and temperature in said compartment when said latch is operated, said printer recording the duration of time the door is ajar.

6. In a mobile vehicle of claim 5 where in said printer has an audible alarm, said alarm activated when the temperature in said compartment is outside said certain range of temperatures, said printer making a written record of the time, date and length of time said temperature is outside said certain range of temperatures.

7. In a mobile vehicle of claim 1 wherein an electronic printer is connected to said computer, said printer including an audible alarm, said alarm activated when the temperature in said compartment is outside said certain range of temperatures, said printer making a written record of the time, date and length of time said temperature is outside said certain range of temperatures.

8. In a mobile vehicle of claim 1 wherein said computer includes a soft start program for operating said refrigerating unit and said electrical heating unit without a power surge in said electrical system.

9. In a mobile vehicle of claim 1 wherein said interior of said compartment is from approximately two cubic feet to approximately four cubic feet and said mounting space in said vehicle is from approximately 18 inches in depth, 20 inches in height and 17.75 inches in width to approximately 26,625 inches in depth, 20.5 inches in height and 17.75 inches in width.

10. In a mobile vehicle of claim 1 wherein the electrical connection between said vehicle electrical system and said temperature controlled compartment includes an elongated power cord connected at one end to said compartment and at the other end to a removable adapter.

* * * * *